UNITED STATES PATENT OFFICE.

MATTHEW LAFLIN, OF CHICAGO, ILLINOIS.

IMPROVEMENT IN COMPOUNDS FOR LINING BARRELS, &c.

Specification forming part of Letters Patent No. 202,834, dated April 23, 1878; application filed March 15, 1878.

*To all whom it may concern:*

Be it known that I, MATTHEW LAFLIN, of Chicago, Cook county, State of Illinois, have invented a new and useful improvement in that class of coating which is designed to prevent the surface to which it is applied from tainting or in any way affecting or being affected by other substances with which it may come in contact, of which the following is a full description.

The object of my invention is to prepare a coating or lining for barrels and other packages, of whatever material, which will preserve the contents pure for a long period of time; and its nature consists in mixing paraffine and bees-wax, as hereinafter more fully described.

The proportions which I think best are about eight (8) parts paraffine to one (1) of bees-wax, melted together.

The mixture is applied while hot, either by pouring it into the package, or with a brush, or other suitable means. When thus applied it forms a hard and glossy coating, with sufficient elasticity to prevent cracking, and which will exclude the air, or prevent its contact with the contents; and it also prevents the contents from coming in contact with the wood, paper, metal, or other material of which the vessel is made.

In preparing the mixture or compound I do not confine myself to the proportions above stated, as it is obvious that more or less of either would give good results.

This composition is designed for coating the inside of vessels used for transporting mineral waters or other liquids, or lard, butter, sausage, meat, &c. It may also be used with good results for coating the surface of eggs, fruits, &c., which may be preserved by preventing atmospheric contact.

What I claim as new, and desire to secure by Letters Patent, is—

A composition of paraffine and bees-wax for lining or coating barrels, packages, or other vessels or pipes, and coating eggs, fruits, and other articles, substantially as specified.

Witness my hand and seal this 8th day of February, 1878.

MATTHEW LAFLIN. [L. S.]

Witnesses:
 JOHN MAXWELL,
 R. B. ENNIS.